Nov. 19, 1946. S. BERTRAM 2,411,357
SPLIT-PHASE SERVOMOTOR CONTROL
Filed Oct. 3, 1944
FIG.1
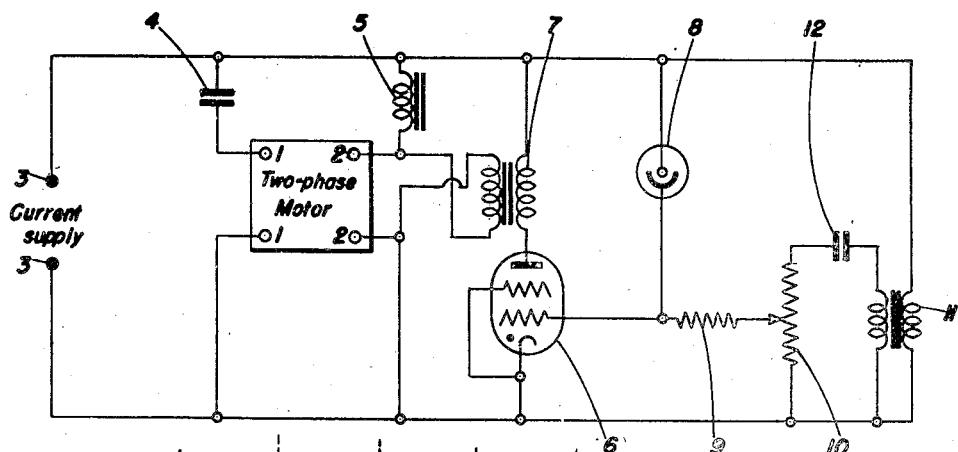
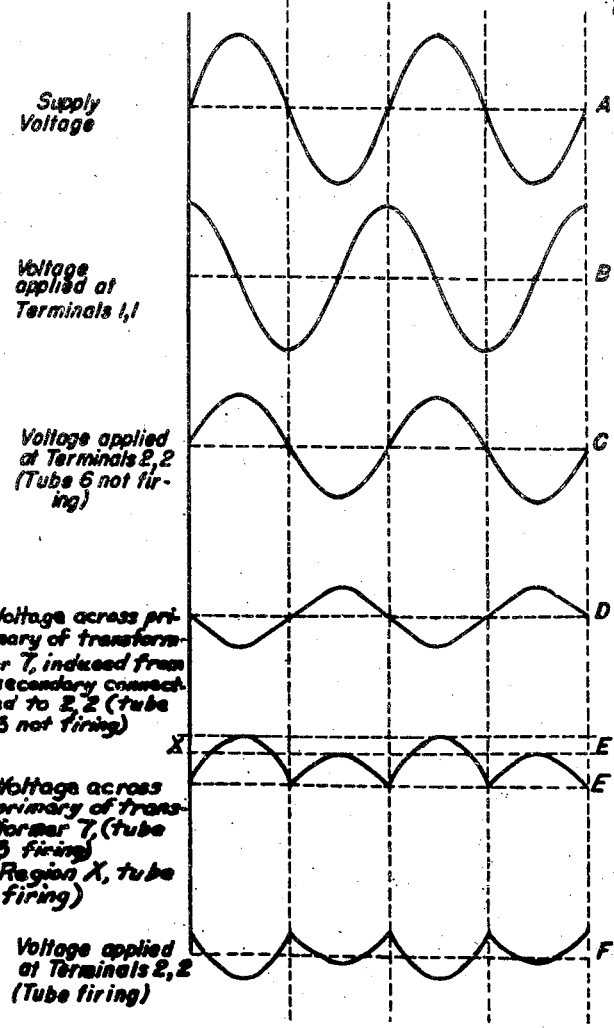
FIG.2
INVENTOR
SIDNEY BERTRAM Patented Nov. 19, 1946

2,411,357

UNITED STATES PATENT OFFICE 2,411,357

SPLIT-PHASE SERVOMOTOR CONTROL

Sidney Bertram, San Diego, Calif., assignor to the United States Government, as represented by the Secretary of the Navy Application October 3, 1944, Serial No. 556,939

11 Claims. (Cl. 172—278)

This invention relates to a servo-slave mechanism, and particularly to a circuit for regulating the rotating fields of polyphase or split-phase induction motors.

There are many instances where it is most desirable and convenient to provide a follower means, where it is, at the same time, impossible to load the means to be followed. It is one of the objects of the invention to provide a circuit, including a two-phase or split-phase induction motor, which will drive the following means in such manner that it follows the movement of the device whose movement is to be repeated or amplified.

It is well known in the art that the rotating field produced by the stator windings in a two-phase induction motor is the resultant of two independent fields, which are produced by separate windings. It is also familiar to those skilled in the art that the torque produced in such a motor is dependent upon the relative magnitudes of these fields and their electrical phase displacement with respect to one another. Assuming constant magnitude, maximum torque is produced when the two fields are 90 electrical degrees out of phase with one another; and minimum, or zero, torque is produced when the two fields are in phase. Phase differences intermediate 0° and 90° produce intermediate torques. When one phase of the stator winding leads the second phase, rotation in a given direction results. When the phase relationship is reversed, so that the first phase lags the second phase, rotation in the other direction is produced. Generally, then, the invention comprises means for governing this phase relationship in a novel manner such that the motor drives the follower means in one direction or the other, or when no phase difference exists, not at all.

In its simplest form, the invention comprises a photo-cell connected to fire a trigger-acting or discharge tube of the "Thyratron" type when the means to be followed causes a change in the light intensity which governs the photo-cell. The cathode-anode path of the discharge tube is connected in series with the primary of a transformer whose secondary is placed across one phase of the stator windings of the motor, so that when fired, the discharge tube takes control of the voltage supplied to that phase of the stator and supplies such voltage in opposite phase to that normally supplied through a separate inductance when the discharge tube is not firing.

The device as described has very broad application and may be used for a variety of purposes, among which may be listed the following: (1) training devices which may be made to follow a rotating member such as a compass card, (2) industrial applications such as the maintenance of constant tension on moving belts, (3) operation of doors, drinking fountains, safety devices, etc., where interruption of the light beam may be made to result in a shifting or sliding rather than a rotating field, and (4) any photo-cell actuated servo-mechanism.

In the drawing:

Fig. 1 is a schematic diagram of the invention.

Fig. 2 is a series of curves laid out along a common abscissa and showing voltages in various portions of the circuit.

In Fig. 1 is shown a conventional two-phase motor in which the four terminals represent those connected to the windings of the two-phase winding of the stator. Terminals 1, 1 on the motor are fed through a phase-shifting capacitor 4 and the other winding is normally fed, through an inductance 5, at terminals 2, 2. Alternatively, a conventional split-phase motor might be used in place of the two-phase unit, in which case the phase-shifting capacitor would be eliminated. A gas tube 6, which may be of the conventional RCA 2050 "Thyratron" type, is connected in series with the primary of transformer 7 across the supply terminals 3, 3. The secondary of transformer 7 is also connected across the second phase of the stator winding at terminals 2, 2.

The gas tube 6 is controlled by a photo-cell 8, which may be of the RCA 927 type, connected to its grid. Grid bias for the gas tube 6 is supplied through resistor 9 and potentiometer 10, while the shield grid is tied to the cathode. This bias is supplied across potentiometer 10 by means of a transformer 11, whose primary is connected across the voltage supply terminals 3, 3. Although not necessary to the functioning of the invention, a capacitor 12 may be connected in series with and on the high side of potentiometer 10 for a purpose to be described.

In operation, the voltage supplied at terminals 1, 1, being fed through capacitor 4, leads the applied voltage by substantially 90°. The other phase winding of the motor is normally fed at terminals 2, 2 through inductance 5, as the gas tube 6, when it is not firing, effectively open circuits the primary of transformer 7. Under these conditions, the inductance 5 feeds the second phase of the motor with a voltage approximately 90° out of phase with that supplied at terminals 1, 1. This is true since when the tube 6 is not firing and the primary of transformer 7 is effectively open circuited, the secondary of the transformer, although connected across the second phase of the motor, has very little effect, its impedance being arranged to be very high. The motor then runs in a direction determined by the (in effect) direct connection of the second phase of the motor across the supply voltage. This is explained by the fact that the motor winding across terminals 2, 2 is, of itself, highly inductive and the effect of inductance 5 is to cause only a lowering of the applied voltage rather than shifting its phase.

The photo-cell 8 is so arranged that when light falls upon it, the current flow causes a substantial change in the grid bias on gas tube 6, so that when its plate becomes positive with respect to the cathode, the tube fires and the primary of transformer 7 is effectively connected directly across the supply voltage during positive excursions of the voltage. The resulting D. C. (rectified) component voltage appears across the secondary of transformer 7 as a large line frequency component, plus harmonics which have no effect on the resulting motor torque. Transformer 7 is so phased that when tube 6 is firing its output is in the opposite phase (180°) to that supplied through inductance 5. Since the impedance of transformer 7 is very materially reduced while tube 6 is firing, the motor is supplied with a voltage of such reversed phase, and the inductance 5 appears as a relatively high impedance. The application of this voltage, reversed in phase, to terminals 2, 2 of the motor, causes a reversal in the direction of its rotation.

The actual operation may be better understood by studying the curves in Fig. 2. Curve A represents the voltage which is supplied to the terminals 3, 3 by the external supply. Curve B represents the voltage applied to terminals 1, 1 regardless of operation of the photo-cell and gas tube, and it will be noted that it is 90° out of phase with the supply voltage of curve A, due to the action of capacitor 4.

Curve C represents the voltage which is applied to terminals 2, 2 when tube 6 is not firing. In this case, since inductance 5, as has been stated, has little effect upon the phase of the applied voltage, the curve shows that the voltage supplied to terminals 2, 2 is of the same phase as the supply voltage of curve A, but reduced in magnitude. Under these conditions, the voltage supplied to terminals 2, 2 (curve C) is 90° out of phase with that supplied to terminals 1, 1 (curve B) and maximum torque is thus produced with the appropriate sign. Curve D shows the voltage appearing across the primary of transformer 7 when tube 6 is not firing. This voltage is induced therein by the action of the secondary connected to terminals 2, 2. When tube 6 fires, the rectified voltage across the primary of transformer 7 is as illustrated in curve E and is seen to consist of a series of positive pulses. Specifically, the pulses of greater amplitude represent the voltage across the primary of transformer 7 during those half-cycles when tube 6 fires. The pulses of smaller amplitude represent the voltage during the alternate half-cycles and therefore are the same as the positive half-cycle pulses shown in curve D. Under these conditions, the voltage induced in the secondary of transformer 7 is shown by curve F and is opposite in phase to the voltage in the primary (curve E), but with its line frequency component substantially 90° out of phase with that supplied to terminals 2, 2 (curve C). Curve F shows a large component of phase reversed to that in curve C being applied to terminals 2, 2 of the motor. However, the D. C. component has been removed with the result that the zero axis has been effectively shifted. The voltage actually applied to terminals 2, 2 when the tube is firing is the resultant of that induced in the secondary of the transformer 7 (curve E) and that supplied by reactance 5, and is illustrated in curve F. It should, of course, be noted that this latter component is of the same phase as that supplied by such reactance to terminals 2, 2 when the tube is not firing (curve C), but that its magnitude has been considerably reduced because, under firing conditions, reactance 5 is a relatively high impedance. In any event, the resultant line frequency component applied to terminals 2, 2 when the tube is firing (curve F) is opposite (180°) in phase to that applied when it is not firing (curve C). Of even more importance is the fact that the line frequency component of the voltage thus applied to terminals 2, 2 under these conditions is also 90° out of phase with that applied at terminals 1, 1 (curve B), and thus again maximum torque is produced. However, it is to be noted that the torque thus produced is in opposite direction to that produced when terminals 2, 2 are supplied through inductance 5 (curve C).

Somewhere between these limiting conditions, operation of the device produces no torque because the resultant voltage applied to terminals 2, 2 is equal to zero. In this case, the component supplied from inductance 5 exactly cancels that supplied from the secondary of transformer 7, and the motor comes to rest.

The curves in Fig. 2, although generally illustrating the respective voltages, are not intended to be as accurate as those which might be obtained from an oscillograph. However, they are intended to and do illustrate the operation of the invention, for which purpose highly accurate plots, including the various harmonics, are unnecessary.

Although the above description includes the principal features of the invention, its usefulness may be considerably increased by an auxiliary capacitor 12. This capacitor, included in the grid circuit of gas tube 6, adds an A. C. voltage component which leads the plate voltage by substantially 90°. The use of such a capacitor results in the firing of the gas tube 6 earlier in the positive portion of the cycle, as the photo-cell 8 becomes increasingly conductive. Hence, the average length of time during which the tube is firing is made to depend upon the action of the photo-cell; and the voltage supplied to motor terminals 2, 2 is caused to shift in phase gradually rather than abruptly. Stated another way, there is a gradual shift in phase from a condition where motor terminals 2, 2 are supplied solely from inductance 5 (as in curve C), to a condition where the gas tube takes over control due to its firing for substantially one-half of each cycle. At one point between these limits, i. e., for some particular intensity of light falling on the photo-cell 8, the resulting voltage applied to terminals 2, 2 will be of greatly reduced magnitude and in phase with that supplied to terminals 1, 1. At this point, the motor will have no torque and will remain stationary. By varying the light falling on the photo-cell, the circuit is thus enabled to drive the motor in either direction, or to bring it to a full stop, with the torque roughly proportional to the change in intensity.

It should also be noted that for most efficient operation, the supply voltage should be considerably larger than is normally required by the motor. This will allow the choice of inductance 5 with an impedance large compared to that of the motor when the tube is fired. This provides an additional advantage in that the gas tube may be operated at higher voltages, and correspondingly lower currents are required for operation. This practice is necessarily limited by the condition where an exceedingly high voltage might cause the tube to flash over in a manner not consistent with the determining grid voltage. Obviously the voltage and current must be maintained within the limits of the tube rating.

There is thus provided an effective and simple servo-slave mechanism which is capable of accurately repeating or amplifying any desired motion.

As was briefly mentioned above, any element which exhibits mechanical distortion due to external forces can easily be arranged to control the light falling on the photo-cell, which in turn enables the motor to realign such forces and again bring them into the desired relationship.

The applications discussed herein are in no way intended to illustrate all of the uses to which the device may be put. They are representative only and many more will immediately occur to those skilled in the art.

I claim:

1. A servo mechanism comprising a source of alternating voltage, an armature, means connected across said source for producing a first magnetic field, an impedance, second means connected in series with said impedance across said source for producing a second magnetic field displaced with respect to said first magnetic field, both of said fields acting on said armature, a vapor-electric discharge tube, control means coupled to said tube, a transformer, said tube and one winding of said transformer being connected in series across said source, the other winding of said transformer being connected across said second means to supply a voltage which is phase-displaced with respect to the voltage from said source when said tube fires.

2. A mechanism as described in claim 1 in which said control means comprises a photo-cell.

3. In combination with mechanism as described in claim 1, a capacitor connected in series with said first mentioned means.

4. In combination with mechanism as described in claim 1, means for supplying grid voltage to said tube with a phase substantially different from that supplied at said source.

5. A servo mechanism comprising a source of alternating voltage, a split-phase motor, one winding of said motor being connected across said source, an impedance connected in series with a second winding of said motor across said source, a grid-controlled gas tube, control means connected to the grid of said tube, a transformer, said tube and one winding of said transformer being connected in series across said source, the other winding of said trasformer being connected across said second winding of said motor to supply a voltage effectively 180° out of phase with the voltage from said source when said tube fires.

6. A mechanism described in claim 5 in which said control means comprises a photo-cell.

7. In a mechanism as described in claim 5, means for supplying grid voltage to said tube with a phase substantially different from that supplied at said source.

8. A servo mechanism comprising a source of alternating voltage, a two-phase motor, one phase of said motor being connected across said source, an impedance, said impedance being connected in series with the second phase of said motor across said source, a grid-controlled gas tube, control means connected to the grid of said tube, a transformer, said tube and one winding of said transformer being connected in series across said source, the other winding of said transformer being connected across said second phase of said motor to supply a voltage effectively 180° out of phase with the voltage from said source when said tube fires.

9. A mechanism as described in claim 8 in which said control means comprises a photo-cell.

10. In a mechanism as described in claim 8, a capacitor connected in series with said one phase of said motor.

11. In a mechanism as described in claim 8, means for supplying grid voltage to said tube with a phase substantially different from that supplied at said source.

SIDNEY BERTRAM.